UNITED STATES PATENT OFFICE.

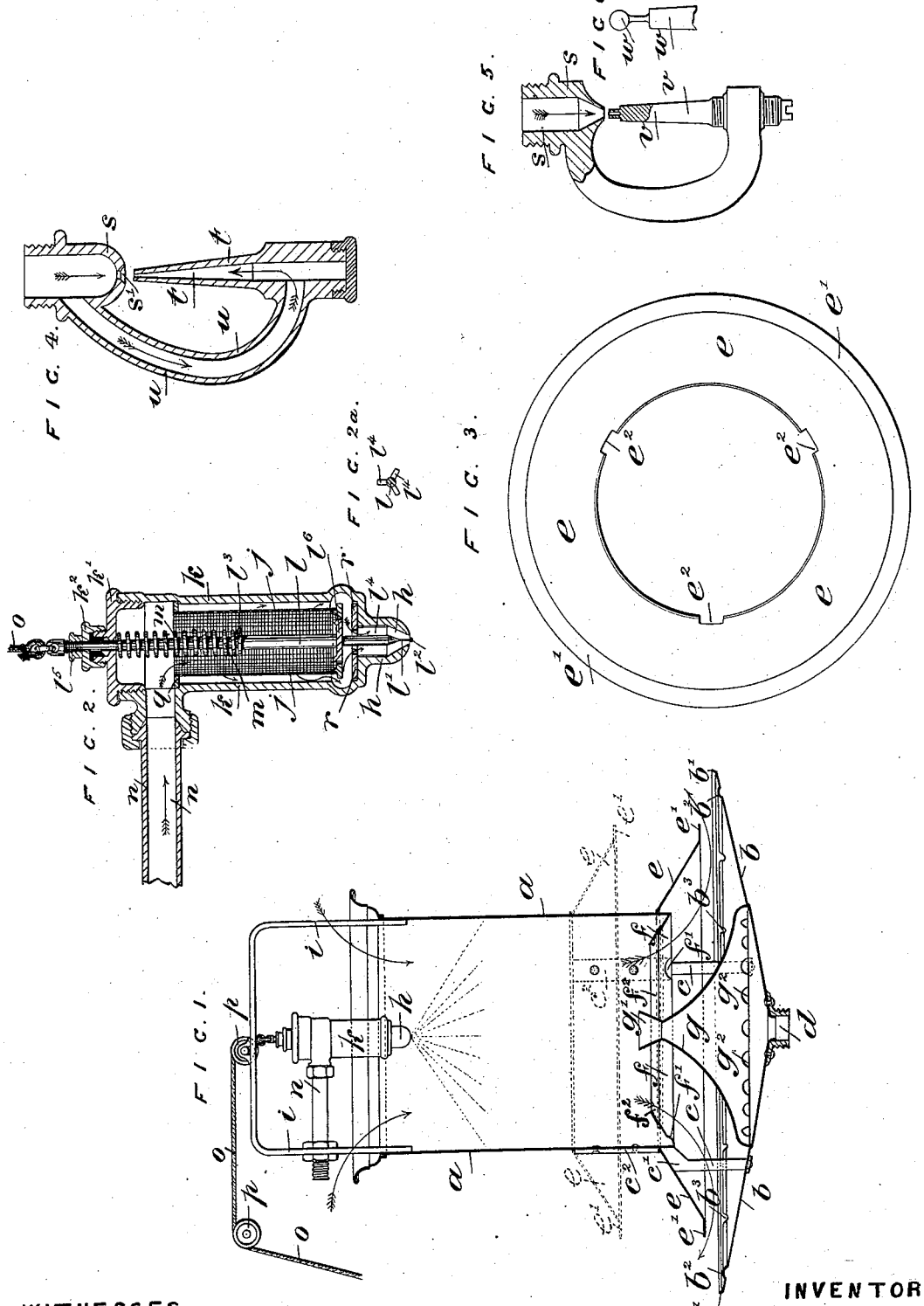

OTTO HOFFMANN, OF MANCHESTER, ENGLAND.

HUMIDIFYING APPARATUS.

SPECIFICATION forming part of Letters Patent No. 588,643, dated August 24, 1897.

Application filed April 4, 1896. Serial No. 586,220. (No model.) Patented in England October 31, 1895, No. 20,554; in Italy November 12, 1895, XXX, 40,155, and LXXVII, 439; in France December 6, 1895, No. 252,238; in Austria December 6, 1895, 46/2,042, No. 5,183; in Switzerland December 10, 1895, No. 11,374; in Spain December 11, 1895, No. 18,386; in Belgium August 8, 1896, No. 122,956, and in India February 12, 1897, No. 129.

*To all whom it may concern:*

Be it known that I, OTTO HOFFMANN, engineer, a subject of the Emperor of Germany, residing at 46 Cresswell Grove, Withington, Manchester, in the county of Lancaster, England, have invented certain new and useful Improvements in and Relating to Humidifying and Spraying Apparatus and Appliances, (for which I have obtained foreign patents as follows: British Patent No. 20,554, dated October 31, 1895; Indian Patent No. 129, dated February 12, 1897; Belgian Patent No. 122,956, dated August 8, 1896; Swiss Patent No. 11,374, dated December 10, 1895; Austrian Patent 46/2,042, No. 5,183, dated December 6, 1895; Spanish Patent No. 18,386, dated December 11, 1895; French Patent No. 252,238, dated December 6, 1895, and Italian Patent XXX, 40,155, and LXXVII, 439, dated November 12, 1895;) and I do hereby declare the following to be a full, clear, and exact description of the invention, which will enable others skilled in the art to which it appertains to make and use the same.

My said invention relates to apparatus and appliances for humidifying the air of factories and other inclosed places and for spraying and diffusing liquids for humidifying, moistening, curative, and other purposes, as is now well understood.

As constituting an apparatus for humidifying the air in factories and the like my improved apparatus would be of the following construction and as illustrated in the annexed sheet of drawings.

In the said drawings, Figure 1 is a vertical section of my improved humidifying apparatus. Fig. 2 is an enlarged section of the filter spraying device, which is marked $k$ in Fig. 1; Fig. $2^a$, a cross-section through the spindle $l$ and wings or guides $l^4$ to be presently described. Fig. 3 is a plan view of the ring $e$ at the foot of the casing in Fig. 1. Fig. 4 is an enlarged sectional view of my improved double-nozzle spraying device. Fig. 5 is a side view, partly in section, of a single-nozzle spraying device; and Fig. 6 is a ball-headed spraying-pin for use in a single-nozzle spraying device.

Referring to the drawings and in the first place to Fig. 1, the main body of the humidifier-casing would consist of a cylinder $a$, open at the top and bottom. At the bottom I arrange a dished tray $b$, connected to the cylinder $a$ by three or any suitable number of hanger-brackets $c$, and so as to allow a space to exist between the lower edge of the cylinder $a$ and the said dished tray $b$. The outer circumference of the said tray $b$ is formed with two annular ridges $b'$ $b^2$, intended to arrest condensed moisture, the inner ridge having gaps $b^3$ to allow the arrested moisture to run down toward the center of the dished tray. In the center of the dished tray is an outlet $d$ to let the arrested and collected moisture drain away. At the foot of the aforesaid cylinder $a$ I provide a loose and separate downwardly-splayed ring $e$, resting upon the inclined knees $c'$ of the aforesaid hanger-brackets $c$. The said splayed ring $e$ trends outwardly and downwardly at an angle toward the upwardly-dished bottom tray $b$, but is of less diameter than the tray. The ring $e$ has a horizontal or flat rim $e'$ at its outer circumference, and a sufficient space is left between this outer circumference of the ring $e$ and the tray $b$ to allow of the passage of the humidified air. The atmospheric air is drawn in at the top, humidified, and expelled at the bottom of the casing. At the foot of the cylinder $a$ I apply an inwardly and upwardly bent flange $f$, which narrows the outlet from the foot of the cylinder $a$ and forms a gutter to catch the condensed liquid trickling down the interior of the cylinder. At the foot of the gutter $f$, and at the points where the hanger-brackets $c$ are located, I form apertures $f'$ in the foot of the gutter $f$, through which the trapped moisture flows down the hanger-brackets $c$ to the tray $b$ beneath and thence to the outflow $d$.

If under certain conditions of service the area of outlet of the cylinder is found too large, it may be still further reduced by means of the small supplemental flange $f^2$, attached to the flange or gutter $f$. This supplemental flange may be of such conformation as to form practically a continuation of the gutter $f$, of which it will virtually form a part.

In the center or lap of the tray $b$ I place a loose curved or inclined deflecting-cone $g$, having at the top a splayed funnel $g'$, while the bottom edge resting on the tray has apertures $g^2$, through which the moisture running down the tray can pass through to the outlet in the center of the tray. The deflecting-cone $g$, being loose, allows the greatest facilities for cleansing. To admit of more easy access to the bottom of the apparatus, the downwardly-splayed ring $e$ at the lower end of the cylinder $a$ is, as already said, placed loosely on the hanger-brackets $c$, the soles $c^2$ of the brackets, where they are riveted to the cylinder, occupying recesses $e^2$, cut in the internal circumference of the ring $e$. When it is desired to move the ring $e$ out of the way, I slide the ring upward on the cylinder $a$ until it is clear of the bracket-soles $c^2$, and then turn it slightly, so as to move the recesses $e^2$ away from or out of line with the bracket-soles $c^2$. The ring then rests on the upper ends of the bracket-soles and is upheld thereby, as clearly shown in dotted lines in Fig. 1, until it is thought fit to slide it again into position.

The hereinbefore-described arrangement and construction of humidifier-casing might be used in conjunction with any suitable spraying device or appliance. I have, however, devised a specific and novel construction of spraying device, which appears and is marked $k$ in Fig. 1, but is more plainly shown to an enlarged scale and in section at Fig. 2.

The said spraying device comprises, essentially, a casing, a nozzle at the lower end of said casing, a movable strainer-cylinder in said casing having upper and lower flanges, seats for said flanges, a pipe leading into the casing between the seats for the upper flange normally supplying liquid to the interior of the strainer, whereby the liquid may be forced to pass below the upper flange through the cylinder from the outside to the inside thereof, or vice versa. The salient advantage of this improved spraying device is that the nozzle or aperture $h$, through which the water is sprayed, can be more easily cleaned out from the floor than heretofore and without the operator being required to mount to the ceiling or elevation at which the humidifier is fixed or suspended (by the bridle $i$) and without removing or handling the nozzle.

To form the combined filter and spraying device, I provide an outer casing $k$, closed at the top by a screwed lid $k'$, and formed at the bottom with a conical nozzle $h$, having a sharp edge at the delivery-outlet, which constitutes the lower and smaller end of the conical orifice. Up through the center of the case $k$ there passes a spindle $l$, the upper end passing through a packed gland $k^2$ in the casing-cover $k'$, while the lower end of the spindle is reduced near the foot, this reduced neck $l'$ terminating in an enlarged rivet or pin head $l^2$, the upper inclined or conical angle or face of which is at an opposite angle to the internal angle of the conical nozzle $h$. The said conical rivet or pin head is of such a size as to be capable of passing through the outlet-orifice at the foot of the conical nozzle $h$. To preserve the spraying-head $l^2$ exactly in the center of the outlet from the nozzle, I form the spindle $l$ at the foot with steadying wings or guides $l^4$, as shown in section at Fig. 2$^a$, which slide in the straight part above the nozzle and keep the spindle and spraying-head always concentric with the nozzle and outlet-orifice. The spindle $l$ is surrounded by a spring $m$, confined between the collar $l^3$ on the spindle and the inner side of the screwed cover $k'$, and which tends constantly to keep the spindle $l$ down and the spraying-head $l^2$ just outside of the nozzle-orifice, as shown in Fig. 2, in such a position that liquid issuing from the nozzle is diverted by the spraying-head $l^2$ and comminuted or sprayed into a thin liquid cone, such as appears in Fig. 1. A check-nut $l^5$, screwed on the upper end of the spindle $l$, enables the spindle and spraying-head to be adjusted to the exact position requisite for obtaining the best results. The water or other liquid is supplied to the spraying device by the pipe $n$ and passes through the filter to the nozzle in the manner indicated by the arrows. The production of this downwardly-inclined cone of spray or liquid draws in air at the top of the casing, saturates it with moisture, and drives it out at the foot of the casing, as shown by the arrows in Fig. 1.

The top of the spindle is connected to a cord $o$ or other attachment, which passes over pulleys $p$ $p$ and descends to the floor from which it can be pulled. It will be observed that at the top of the filter $j$ is a ring $q$, by which the filter is suspended in the casing $k$ and which works against two seats, one above and the other below the inlet $n$. Above the ring $q$ is a chamber into which the water-supply opens and in which the suspending-ring $q$ can slide, which chamber is located between said seats for the ring $q$. Under normal conditions the foot of the filter $j$ is closed by a disk $l^5$ on the spindle $l$, the lower cylindrical portion of the casing forming a seat for said ring. Above the guiding-wings $l^4$ lies a loose plate $r$, a short distance beneath the foot of the filter. When the nozzle $h$ threatens to become choked, the cord $o$ is operated and the spindle $l$ and spraying-head $l^2$ pulled up against the spring $m$, the spraying-head $l^2$ passing up through the nozzle outlet and clearing away any obstruction lodged therein. On releasing the cord $o$ the spindle and spraying-head return to their normal position. While the spindle is pulled up and the liquid is flushing through the nozzle without spraying the liquid falls straight down through the hole in the bottom of the filter, caused by the removal of the disk $l^5$, and falls straight from the nozzle into the funnel $g'$ on the top of the deflecting-cone $g$ at the foot of the casing and goes straight to the outflow $d$ in the center of the tray $b$. This self-cleansing spraying device might be used alone, but in combination therewith I prefer to use the illustrated filter.

The filtering medium is contained in the inner pervious envelop $j$, of gauze or other material, a space being left between the outer circumference of the filter-envelop $j$ and the interior of the outer case $k$, as shown in Fig. 2. The liquid is admitted above the filter through the pipe $n$ and enters the filter at the top. The liquid next passes outward through the pervious gauze envelop $j$ and down through the space to the nozzle. Now suppose it should be desired to wash out the filter by reversing the direction of the current of liquid through it without altering the direction of the feed-supply. I arrange that the filter may be lifted in the casing by the same cord which raises the spindle, so that instead of the liquid entering the filter at the top and passing outward through the periphery it enters through the gauze periphery $j$ and passes inward and downward through the filter. This is done by pulling on the cord $o$ till the wings $l^4$ on the spindle $l$ lift the loose ring $r$ against the bottom of the filter and so raise the filter till the ring $q$ at the top of the filter comes against the screwed cap $k'$. In this position the water has no access to the top of the filter and is obliged to find its way through the pervious envelop $j$ to the interior of the filter, and thence through the hole in the bottom. Thus the current through the filter is reversed by merely altering the position of the filter. This specific arrangement of filter might be used in conjunction with the spraying device and humidifier-casing hereinbefore indicated, or it may be used in combination with any other spraying device or casing used for the indicated or for cognate purposes. For example, instead of the inclined spraying-nozzle $h$ and pin-head $l^2$ I might use the double-nozzle spraying device shown at Fig. 4. In this device the two nozzles $s$ $t$ are connected by a hollow arm $u$. The water is supplied at $s$ and is conducted by the arm $u$ to $t$. The orifice at $s$ is larger than the orifice at $t$, so that the two opposing streams of water are unequal and a cone of spray is produced. The nozzle $s$ is formed with a countersink recess, (marked $s'$.) If the nozzle $s$ should be choked by any obstruction, the spraying device will not cease to act, because the nozzle $s$ then becomes a solid spraying-head and the conical face of the countersink $s'$ throws down a cone of spray similar to the cone produced by the opposing streams.

Instead of using the double nozzle shown in Fig. 4 I might, in combination with my improved humidifier, use the single-nozzle spraying device shown in Fig. 5. Here a perforated adjustable pin $v$ is held opposite to the water-nozzle $s$ and produces the desired cone.

Instead of the perforated or hollow pin $v$ I might use a ball-headed pin $w$, as shown in Fig. 6.

What I claim as my invention is—

1. A movable spraying device of the character described, comprising a casing, a nozzle at the lower end of said casing, a movable strainer-cylinder in said casing having upper and lower flanges, seats for said flanges, and a pipe leading into the casing between the seats for the upper flange, normally supplying liquid to the interior of said strainer, whereby the liquid may be forced to pass below the upper flange through the cylinder from the outside to the inside thereof, or vice versa, substantially as set forth.

2. A movable spraying device of the character described, comprising a casing, a nozzle at the lower end of said casing, a movable strainer-cylinder in said casing having upper and lower flanges, seats for said flanges, a pipe leading into the casing between the seats for the upper flange, normally supplying liquid to the interior of said strainer, whereby the liquid may be forced to pass below the upper flange through the cylinder from the outside to the inside thereof, or vice versa, and means for moving the strainer, substantially as set forth.

3. In a humidifying apparatus, the combination of a casing $a$, a spraying device within said casing, brackets $c$ at the lower end of said casing, the dished tray $b$ carried by said brackets, a loose inclined ring $e$ normally supported by said brackets at the lower end of the casing $a$, said inclined ring being provided with recesses $e^2$ therein for accommodating the feet $c^2$ of said brackets, whereby the ring $e$ may be elevated above said feet and rotated slightly so as to be supported on said feet, substantially as set forth.

4. In a humidifying apparatus, the combination of a casing $a$, a spraying device within said casing, and a dished tray $b$ carried at the lower end of said casing, said dished tray being provided with annular trap-ridges $b'$, $b^2$, at the edge thereof, and with gaps $b^3$ in the inner ridge $b^2$, substantially as set forth.

5. In a humidifying apparatus, the combination of a casing $a$, a spraying device in said casing, said spraying device normally spraying liquid within said casing, but adapted to be cleaned substantially as described, whereby a continuous stream will flow vertically therefrom, and a removable central cone $g$ supported at the lower end of the casing, and having a central opening for receiving the stream from the spraying device when the same is being cleaned, substantially as set forth.

6. In a humidifying apparatus, the combination of a casing $a$, a spraying device therein of the character described, a dished tray $b$ at the lower end of said casing, an outlet $d$ in said dished tray, and a central cone $g$ carried by said dished tray and having a funnel opening $g'$ therein, for the purpose mentioned, substantially as set forth.

7. In a humidifying apparatus, the combination of a casing $a$, a spraying device therein of the character described, a dished tray $b$ carried at the lower end of said casing, and having a discharge-opening $d$ therein, a central cone $g$ supported by said dished tray and having a funnel-opening $g'$ therein, and a loose inclined ring $e$ at the lower end of the casing and arranged with the lower end of said ring adjacent to the dished tray, substantially as set forth.

This specification signed and witnessed the 25th day of March, 1896.

OTTO HOFFMANN.

Witnesses:
 MADGE GRIFFIN,
 RICHARD IBBERSON.